United States Patent [19]

Leon et al.

[11] Patent Number: 5,582,447
[45] Date of Patent: Dec. 10, 1996

[54] LOCKING DEVICE WITH SERPENTINE GRIPPING MEMBER

[75] Inventors: Jeremy P. Leon, Morris Township; Richard C. Dreisbach, North Arlington; Alexander Kelso, Lyndhurst, all of N.J.

[73] Assignee: E. J. Brooks Company, Newark, N.J.

[21] Appl. No.: 390,305

[22] Filed: Feb. 24, 1995

[51] Int. Cl.⁶ ............................ B65D 55/06; E05B 39/02
[52] U.S. Cl. ................... 292/307 R; 292/324; 292/327; 411/75; 411/517; 411/530; 24/115 M; 24/136 L
[58] Field of Search ............... 292/307 R, 323, 292/322, 324, 327; 411/517, 530, 246, 247, 248, 249, 250, 251, 254, 75; 24/136 L, 115 G, 115 N, 136 R, 115 M

[56] References Cited

U.S. PATENT DOCUMENTS

| | | |
|---|---|---|
| 968,665 | 8/1910 | Humphrey . |
| 1,508,026 | 9/1924 | Noble . |
| 1,808,075 | 6/1931 | Rothschild . |
| 2,503,093 | 4/1950 | Buchanan . |
| 3,232,088 | 1/1966 | Newcomer, Jr. et al. ......... 411/530 X |
| 4,097,164 | 6/1978 | Campbell . |
| 4,280,726 | 7/1981 | McCoag ................. 292/324 X |
| 4,802,699 | 2/1989 | Smith . |
| 4,802,700 | 2/1989 | Stevenson et al. . |
| 5,161,838 | 11/1992 | Ely et al. ................ 292/327 |
| 5,222,776 | 6/1993 | Georgopoulos et al. . |
| 5,413,393 | 5/1995 | Georgopoulos et al. ......... 292/327 |

FOREIGN PATENT DOCUMENTS

| | | |
|---|---|---|
| 93121951 | 2/1995 | Germany . |
| 93121954 | 2/1995 | Germany . |
| 188941 | 4/1937 | Switzerland . |
| 551038 | 2/1943 | United Kingdom ............ 411/250 |
| 1563833 | 4/1980 | United Kingdom ............ 292/327 |

*Primary Examiner*—Rodney M. Lindsey
*Attorney, Agent, or Firm*—William Squire

[57] ABSTRACT

A serpentine shaped wire clip is disposed in a tapered bore of a housing for axial displacement in the bore and has in a preferred embodiment three U-shaped loops interconnected by end portions. The clip has a bore dimensioned for receiving a cable or rod in radial resilient compressive engagement along the clip entire length which engagement causes the clip to axial displace with the displacement of the cable or rod. The axial displacement of the clip in the tapered bore wedges the clip to the housing and cable or rod locking the elements. The clip may have any number of loops and wire diameter. Also, the housing may have a cylindrical bore and the tapered region may be formed on a rod or bar. The clip may be locked to smooth and grooved surfaces including threads. The housing and rod each have a different one of a cylindrical surface and tapered surface. The clip radially grips the cylindrical surface while wedging in response to relative displacement of the tapered surface to the cylindrical surface. Preferably the tapered surface is the hardest and the cylindrical surface is the softest when the cylindrical surface is smooth.

46 Claims, 7 Drawing Sheets

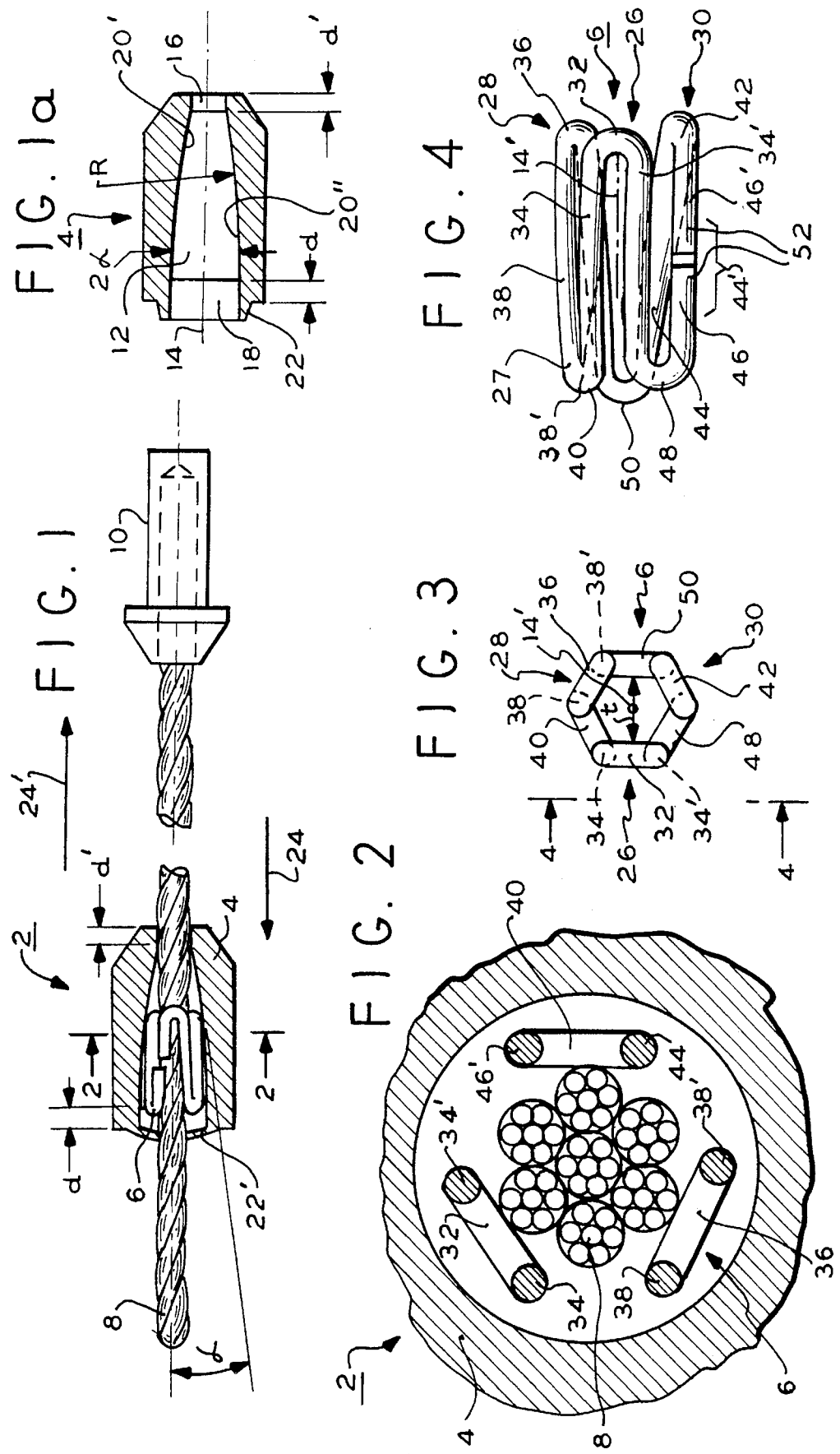

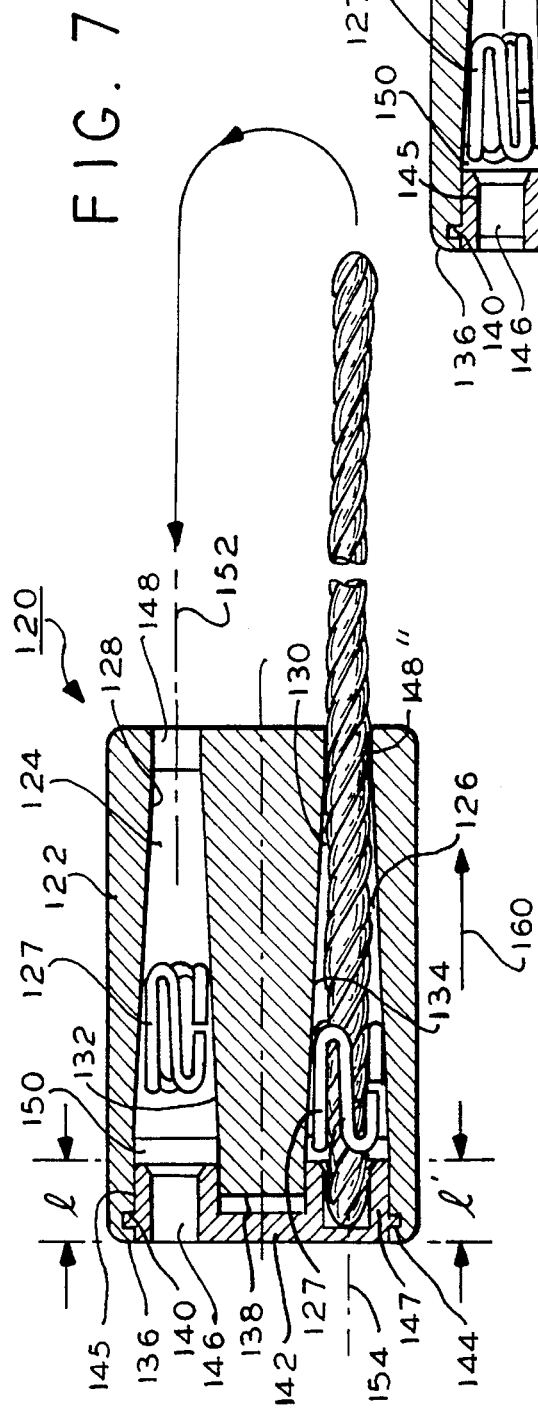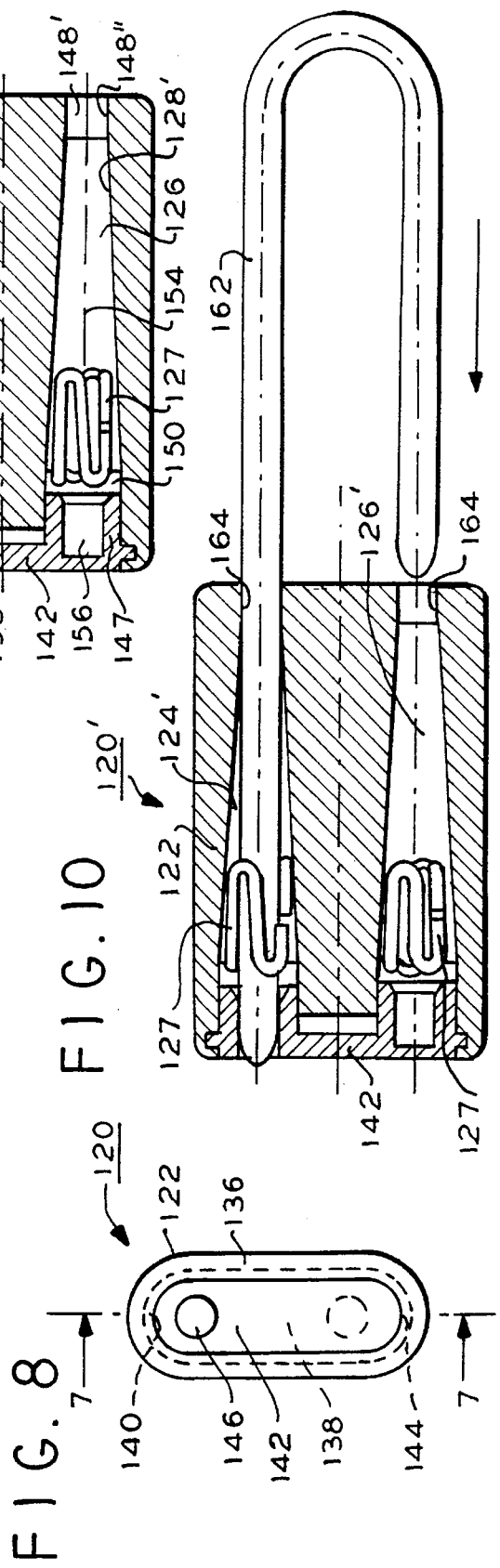

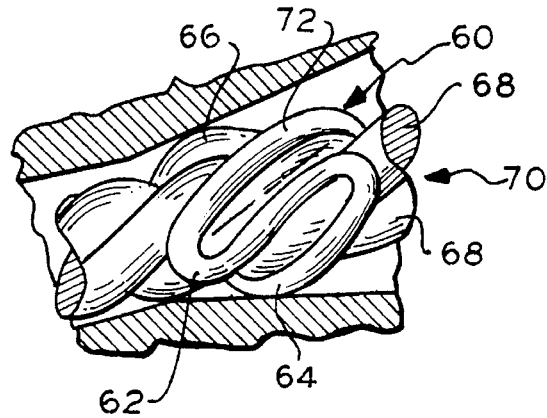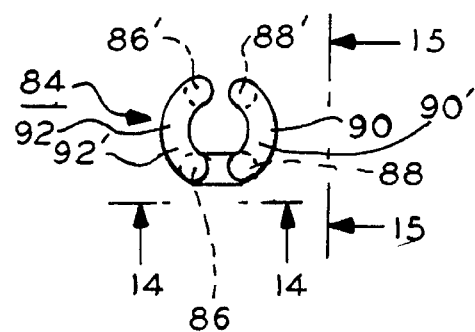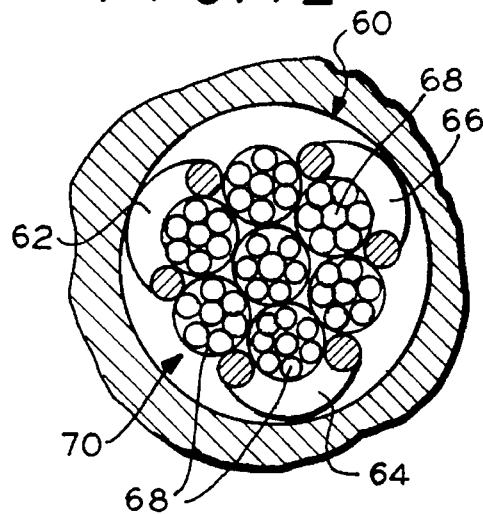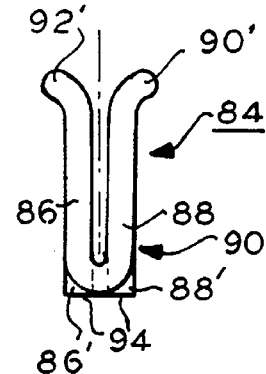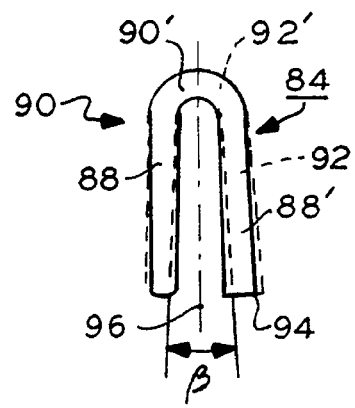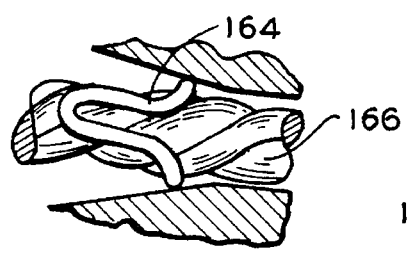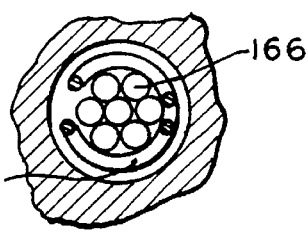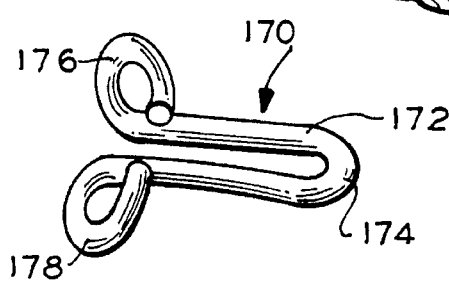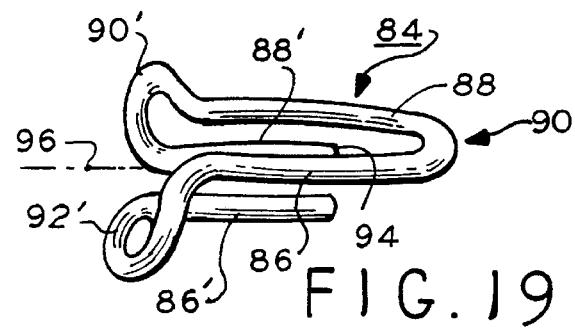

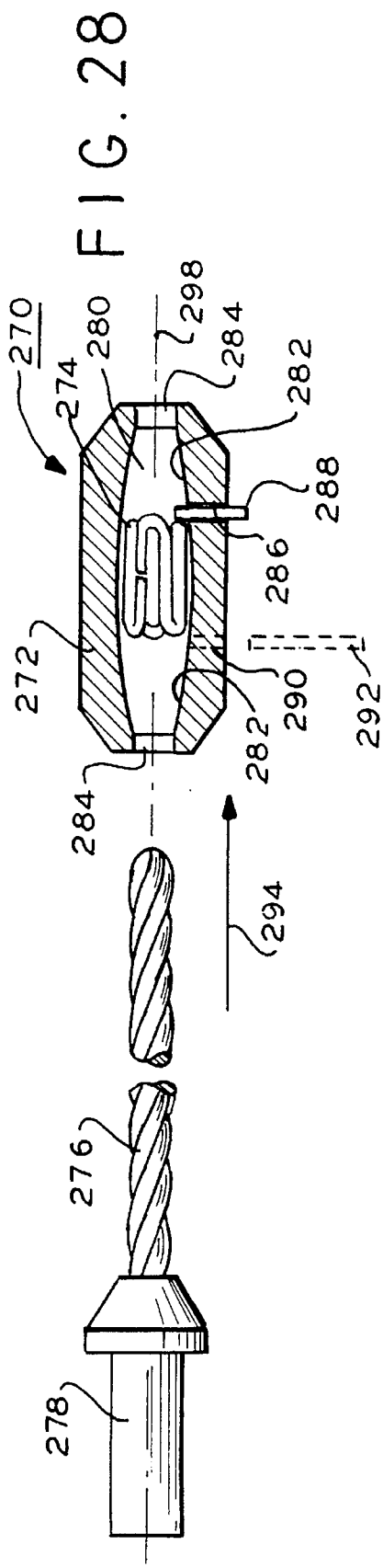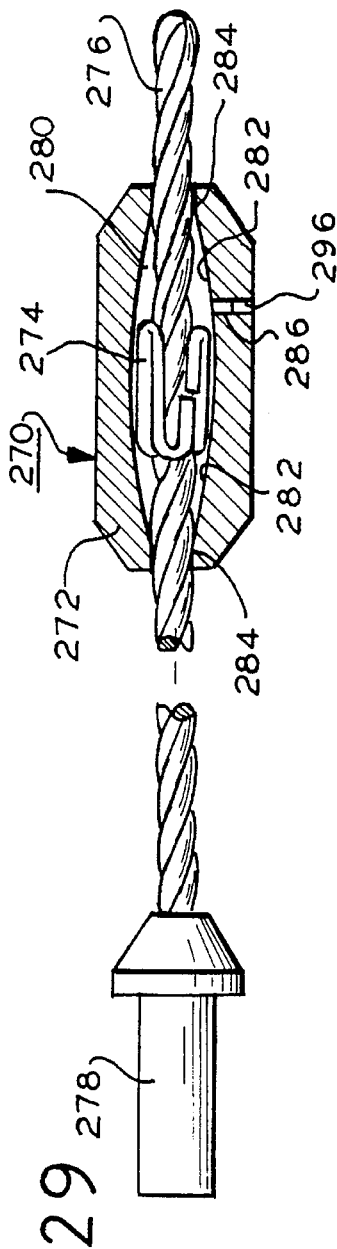

LOCKING DEVICE WITH SERPENTINE GRIPPING MEMBER

BACKGROUND OF THE INVENTION

This invention relates to locking devices, some of which are sometimes referred to as seals, and more particularly, to devices in which an elongated member is locked to a tapered housing bore upon axial displacement of the member relative to the housing.

Of interest are commonly owned copending applications entitled "Reusable Seal for Use with Rod" Ser. No. 106,428 filed Aug. 13, 1993 in the name of George Georgopoulos et al. and Ser. No. 221,589 entitled "Seal" filed Apr. 6, 1994 in the name of George Georgopoulos et al. See also commonly owned U.S. Pat. No. 5,347,689.

Locking devices generally are known and widely used. For example, U.S. Pat. No. 5,222,776 discloses one such device wherein a flexible metal cable has one end permanently secured in a housing bore via an enlarged member secured to that one end. The cable other end is secured selectively in a second housing bore which is tapered by a pair of balls and a spring. The balls wedge against the cable for locking that end in the tapered bore when the cable is displaced in a direction to withdraw the cable from the bore. This is relatively complex and uses a number of different elements which add to the cost of the device.

Another locking arrangement is disclosed in U.S. Pat. No. 4,802,700. In this patent an annular channel is formed in a rod and in a lock body bore. A ring in the channels locks the rod to the lock body. this device, however, is not disclosed as usable with a stranded cable.

U.S. Pat. No. 4,097,164 discloses an arrangement for securing a strand to a terminal body using a deformable member surrounding the strand. The body is deformed to deform the member to secure the strand to the terminal body. This arrangement is not reusable as the body is deformed to secure the strand thereto.

U.S. Pat. No. 4,802,699 discloses securing a bolt to hasps with a locking portion comprising a plurality of parallel spaced grooves in the bolt and a cylindrical member having snap rings which engage the bolt grooves. The member provides a camming action to lock the member on the snap rings.

U.S. Pat. No. 1,808,075 discloses two complementary members for gripping a rope therebetween. A plurality of fingers are formed in the member to grip the rope. the members are held together by a ring. The members are provided with tongues to preclude relative displacement. The members are mounted in a tapered passage of an eye member which secure the members to the rope and to the eye member.

U.S. Pat. No. 968,665 discloses a U-shaped sheet material clip having bent over facing flat sheet material bent arms with a V-shaped notch on one arm end and an opening at the juncture of the arms. One end of a flexible rope element is knotted to secure it in a casing in which the clip is located. The free end is passed between the bent arms of the clip and through the notch and opening. The notch precludes withdrawal of the rope element therethrough.

Other locking arrangements employ cable or rod gripping collets including fingers or segments which engage a casing tapered bore and which also engage a received cable in the bore. The fingers wedge the cable when it is withdrawn from the smaller end of the tapered bore. See for example U.S. Pat. Nos. 3,524,228; 4,333,649 and 2,144,050.

All of the above structures are adapted for different locking conditions, are relatively costly and usually are designed for a given cable or rod outer dimensions. The present inventors recognize a need for a locking device which is simple, uses few components and which is adaptable for gripping cables or rigid rods.

Further, a need is seen for a locking device which is capable of locking to cables of different diameters. Typical quarter inch (6 mm) diameter cables may vary as much as 0.020 inches (0.5 mm) in diameter. This is a problem with the finger collet arrangements which are generally designed to mate only with cables of given diameter of a smaller tolerance than the 0.020 inches commercially available for that size cable. Also, for example, a need is seen for a locking device configuration which is adaptable for different size cables, e.g., ¼ inch, ⅛ inch (6 to 3 mm) and so on. Certain of the prior art could present problems with relatively small diameter cables due to dimensioning of the gripping members and tapered housing bores.

A need is also seen for devices comprising universally applicable gripping members configurations which can hold and lock a rod or cable regardless of the smoothness of the surface finish. Further, it is recognized by the present inventors that such a locking device should lock the cable or rod so that the cable or rod breaks prior to the device permitting the cable or rod to be removed therefrom in response to a load on the cable or rod. Also, it is desirable to provide anti-picking measures to preclude tampering.

A locking device according to one embodiment of the present invention comprises a housing having an opening on a first axis, a member for being received in the opening along the axis; and a serpentine shaped clip in radial resilient compressive engagement with one of the housing at the opening and member, the other of the housing and member having a tapered surface for receiving the clip, the clip, opening and tapered surface being dimensioned so that the received clip is wedged between the housing and member in response to relative axial displacement of the engaged clip to the tapered surface in the opening.

A locking device for securing a cylindrical member thereto according to a further embodiment comprises a housing having a bore which tapers from a larger diameter to a smaller diameter along a first axis, the housing having at least one opening for receiving the cylindrical member in the bore along the first axis; the clip being in the tapered bore, the clip comprising an elongated resilient member having a serpentine configuration which defines a bore having a second axis for receiving the cylindrical member, the clip being dimensioned to axially slidably receive the cylindrical member in compressive engagement therewith, the clip for axially displacing with the displacement of the cylindrical member and being dimensioned relative to the tapered bore and to the cylindrical member such that the clip is wedged in locked engagement to and between the cylindrical member and the housing in response to the displacement of the cylindrical member toward the smaller diameter.

According to a further embodiment, the clip is a homogeneous single piece material having at least one loop member extending from at least one further member, the further member extending in an annular direction about the second axis, the at least one loop member extending from at least one further member generally along the second axis.

In a still further embodiment, the clip comprises a single piece of homogeneous material including a plurality of loops extending generally along the second axis.

In a further embodiment, the loops are substantially symmetrical with respect to the second axis.

In a further embodiment, the clip comprises a first loop member having proximal and distal ends, the loop member extending along a second axis between the ends and a further member joined to the loop member at one loop member end and extending at least partially about the second axis to form a serpentine structure with the loop member, the serpentine structure being radially resilient relative to the second axis and dimensioned to extend at least partially about the received member in resilient radial compressive gripping engagement with at least one of the housing and received member, the tapered surface for receiving the clip and being dimensioned to permit the received clip to be displaced along the first axis.

In a further embodiment the clip is in radial resilient compressive engagement with one of the housing at a housing opening and member and extends along an axis a given length, the clip being in resilient radial engagement along substantially the axial length, the other of the housing and member having a tapered surface for receiving the clip, the clip, opening and tapered surface being dimensioned so that the received clip is wedged between the housing and member in response to relative axial displacement of the member to the housing.

In a still further embodiment, a clip is in radial resilient compressive engagement with one of the housing at a housing opening and member, the other of the housing and member having continuous dual mirror image tapered surfaces extending along an axis for axially receiving the clip, the clip, opening and tapered surfaces being dimensioned so that the received clip is wedged between the housing and member in response to relative axial displacement of the member to the tapered surfaces in either of two opposing directions in the opening.

BRIEF DESCRIPTION OF THE DRAWING

FIG. 1 is a side elevation sectional view of a locking device according to one embodiment of the present invention showing a cable locked to a housing by a clip;

FIG. 1a is a side elevation sectional view of the housing of the locking device of FIG. 1 prior to assembly of the clip in FIG. 1;

FIG. 2 is an end sectional view of the device of FIG. 1 taken along lines 2—2;

FIG. 3 is an end view of the clip used in the embodiment of FIG. 1;

FIG. 7 is a side elevation sectional view of the locking device of FIG. 8 taken along lines 7—7 showing a cable locked to the housing at one cable end;

FIG. 8 is an end elevation view of a locking device according to a third embodiment of the present invention;

FIG. 9 is a view similar to that of FIG. 7 without the cable inserted in the housing;

FIG. 10 is a sectional elevation view of a locking device of the same construction as the device of FIG. 7 but locking a smooth surfaced rod in place of the cable of FIG. 7;

FIG. 11 is an isometric view of a further embodiment a clip which can be used in the locking device of the embodiments of FIGS. 1, 5 and 7;

FIG. 12 is an end sectional elevation view of the device of FIG. 12;

FIGS. 13–15, 19 are respective end, side elevation isometric views of a clip according to a further embodiment of the present invention, FIGS. 14 and 15 being taken along respective lines 14—14 and 15—15 of FIG. 13;

FIG. 16 is a side elevation sectional view of an embodiment of a locking device using the clip of FIGS. 13–15 with a cable;

FIG. 17 is a sectional end elevation view of the device of FIG. 16;

FIGS. 18 and 20 are isometric views of further embodiments Of clips according to the present invention;

FIGS. 21b, 23b and 24b are respective side elevation views of the clips of FIGS. 21a, 23a and 24a, FIG. 22b being an isometric view of the clip of FIG. 22a.;

FIG. 25b is an exploded view of the embodiment of FIG. 25a;

FIG. 26b is an exploded view of the embodiment of FIG. 6a;

FIG. 28 is an exploded side elevation view, partially in section, illustrating a further embodiment of a locking device according to the present invention;

FIG. 29 is a side elevation sectional view of the embodiment of FIG. 28 in the assembled state; and FIG. 30 is a side elevation sectional view of a further embodiment of a locking device according to the present invention.

In FIG. 1, locking device 2 comprises a housing 4, a serpentine shaped clip 6, a stranded metal cable 8 and a flag 10 swaged to an end of the cable 8. The device 2 is used as a seal in this embodiment to secure a container lid or door. The housing 4, FIG. 1a, comprises preferably hardened metal, but could be molded thermoplastic or other metals in the alternative according to a given implementation. The housing 4, sometimes referred to as a casing, has a bore 12 concentric with axis 14. The bore 12 has circular cylindrical end portions forming cable receiving openings 16 and 18. Medially the end portions is tapered bore portion 20.

Figure 5:
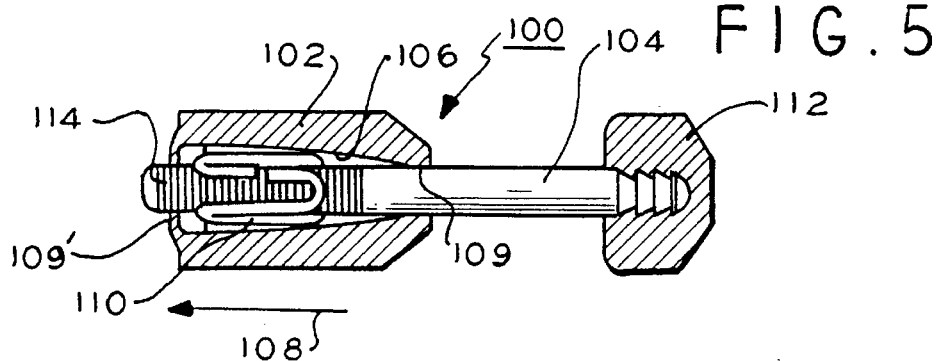
FIG. 5 is a side elevation sectional view of a locking device according to a second embodiment of the present invention.

The tapered bore portion 20 preferably comprises two sections 20' and 20". The section 20' terminates tangentially with portion 20" to form a smooth continuous annular surface therewith. Portion 20' is generated by a rotating a curve having a radius R about axis 14 and therefore is spheroidal. Radius R may in one embodiment have a value of about 4 inches (about 10 cm).

Portion 20" is conical and subtends an angle 2∝ where ∝ is preferably about 3°. If ∝ were smaller then the length of the housing bore 12 becomes relatively long and undesirable because this would require a relatively larger housing which is costly. If ∝ were considerably larger, e.g.,5°, the device would not lock and the cable would slip.

To shorten the length of the bore 12, portion 20' is provided with the radius R to form the angle ∝ at a greater value than the 3°. The combination of the two portions 20' and 20" permits the clip 6 to axially displace along the axis 14 to lock and a unlock positions as will be described. This displacement is essential for the device 2 in this embodiment to operate properly. But by providing the portion 20' with the greater angle, the extent of such axial displacement is foreshortened. Thus compound angles of the tapered surface of the bore 12 are useful to foreshorten the housing length. Also, the radius R if made significantly smaller provides a taper with a relatively steep inclination toward the axis 14 which is useful in certain implementations as described below.

The housing 4 includes an annular lip 22 which is rolled over in FIG. 1 to form closure 22' to lock the clip 6 in the bore 12 at the larger bore 12 diameter end of the housing. The cylindrical portion 28 has an axial extent d and a diameter the same as the larger diameter of the portion 20" so the clip 6 can displace therein. The other bore 12 end is of smaller diameter at opening 16 than opening 18. Opening 16 has an axial extent d' which serves as a guide for insertion of the cable 8 into the bore 12 in direction 24. The tapered bore portion 20' terminates in a diameter the same as the diameter of portion 16.

By way of example, the bore 20 axis 14 is spaced in this embodiment a distance of about 3.8 inches (about 9.7 mm) to the point at which radius R of 4 inch value is rotated. Bore portion 16 may have a diameter of about 0.26 inches (about 6.6 mm) for receiving a cable 8 of nominal ¼ inch diameter. The opening 18 has a diameter of about 0.5 inches (12.7 mm). The housing 4, FIG. 1, has an outer length of about 1.4 inches (3.6 cm), and is formed of case hardened material. Soft materials for the housing are not desirable where tamper proof requirements exist such as seals for securing valuable goods. Softer housings permit a pick tool to work its way into the bore 12 through the end openings between the cable and housing. Where picking is not a problem then the hardness of the housing is not an important factor.

The cable 8 is in this embodiment is a 7 by 7¼ inch nominal diameter cable, which means it comprises 7 bundles of 7 strands of wire each. Other cable sizes, e.g. ⅛ inch (3.2 mm) or cylindrical members may be used such as smooth or grooved steel or other metal rods or other materials such as thermoplastics, e.g., nylon or Delrin or so called engineering plastics such as General Electric Ultem (a trademark of the General Electric Corporation) for relatively high strength and high melt temperature (600° and greater) plastics.

The flag 10 at one end of the cable is metal permanently secured to the cable 8 and of larger diameter than the bore diameter of portion 16 and the bore diameter through the closure 22'.

Figure 4B:
FIGS. 4b and 4c; 4d and 4e, and 4f and 4g are respective end and side elevation views of clips according to further embodiments of the present invention.
Figure 4D:
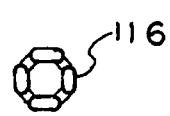
FIG. 4 is a side elevation view of the clip of FIG. 3 taken along lines 4—4.
FIG. 4a is an isometric view of the clip of FIGS. 3 and 4.
Figure 4F:
Figure 4A:
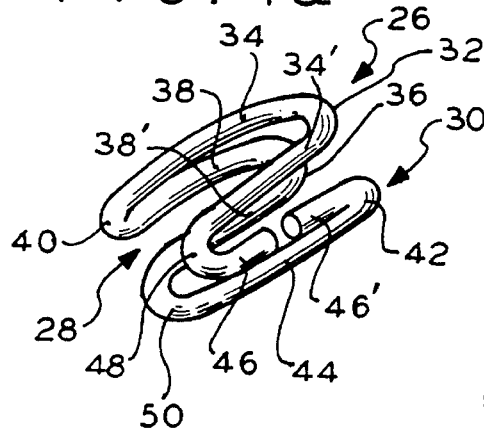

The clip 6, FIGS. 3, 4 and 4a, is given as hexagonal in end view by way of example for illustration. Preferably the clip is circular in end view as illustrated in the clip of the embodiment of FIG. 4b. The clip 6 of FIGS. 3, 4 and 4a comprises a metal circular cylindrical elongated member, e.g., a wire 27, bent into a serpentine shape as illustrated.

Clip 6 includes three U-shaped loop members 26, 28 and 30 forming radially resilient axially extending fingers. Members 26 and 28 are preferably identical. Member 26 has at its proximal end a circular segment base portion 32. Two preferably linear legs 34, 34' extend from base portion 32. The legs could also be arcuate in the form of lobes. Member 28 has a circular segment base portion 36 at its proximal end from which two preferably linear legs 38, 38' extend. The distal end of legs 34 and 38 are interconnected with a circular segment end portion 40.

Loop member 30 has substantially the same dimensions and shape as loop members 26 and 28. Member 30 comprises a proximal circular segment end base portion 42 and a pair of linearly extending legs 44 and 44'. Leg 44' is segmented into two end sections 46, 46' of the wire ends 52. These end sections while spaced from each essentially form a leg of the member 30 although section 46 is not attached to base portion 42 and is not directly connected to the remainder of the member 30. However, the sections 46 and 46' function and cooperate generally as if integral as the one piece legs of the other members 26 and 28.

In the alternative, the wire ends 52 may each terminate at the end of a different leg of one U-shaped member. In this case there would be no distal end portion connecting the ends 52 of this leg pair. An example of this embodiment is clip 54 shown in FIGS. 4b and 4c. This embodiment however differs further in that the U-shaped members and end portions form a circular ring in end view as seen in FIG. 4b.

Section 46 at the distal member end is connected to the leg 34' by circular segment end portion 48. Circular segment end portion 50 connects the legs 34 and 44. All of the legs except leg 44', the base portions and end portions are substantially identical.

The members 26, 28 and 30 each are planar as are the end portions 40, 48 and 50 so as to form a hexagon in end view as seen in FIG. 3. The clip 6 is symmetrical. Symmetry is desired because the clip can then be inserted into the housing 4 bore 12 regardless the clip orientation. In other embodiments described below the clips are asymmetrical and can only be inserted in the tapered bore of the body in one orientation.

Figure 6:
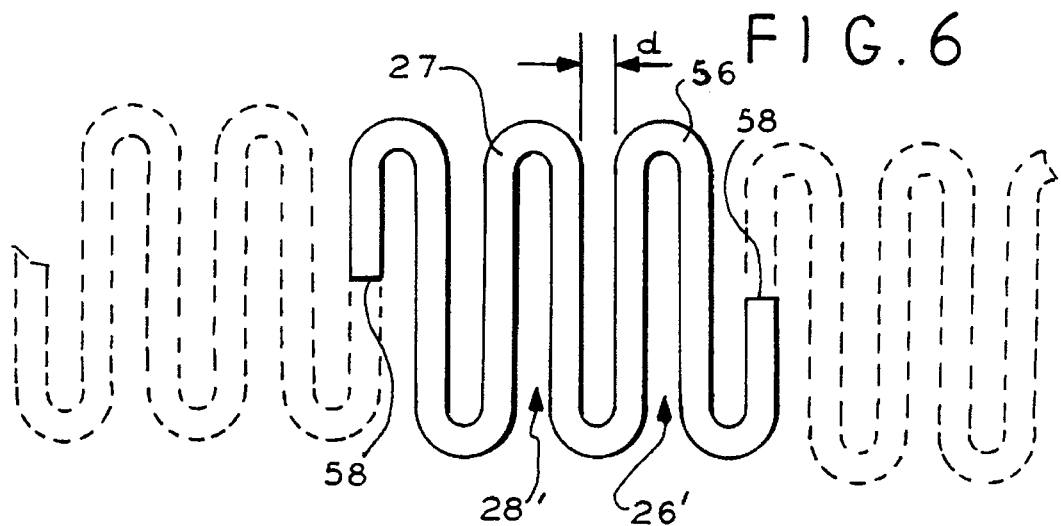
FIG. 6 is a plan view of the clip of FIGS. 3 and 4 in one stage of formation of the clip.

The pitch of the loop members 26, 28 and 30 is important. In FIG. 6, the pitch is represented by the distance d between adjacent loop members such as loop members 26' and 28' corresponding to loop members 26 and 28, FIG. 4, respectively. The pitch d has a value which is preferably about 1.5 times the diameter of the wire 27 which is circular cylindrical. The further apart the loop members for a given wire diameter, the less effective the resilient gripping action on the gripped cable or other structure, as the case may be as explained below. The pitch is determined by the radius of the base portion such as portion 42 and an end section, such as section 46, FIG. 4, for example. These portions and sections are substantially identical for a symmetrical clip 6.

The clip 6 has the advantage over prior art collets in that it is radially compressively resilient along its entire length. This is important because this provides the clip with enhanced gripping action to the engaged surfaces. The radial resilience also accommodates relatively wide radial tolerances and dimensional variations of the cables and rods being secured by the device 2. Prior art gripping devices, either are rigid segments or resilient cantilevered fingers, arranged to resiliently grip only at one end, if at all. These have a less effective tolerance for variations in cable diameter.

In the alternative, the clip 6 may be formed in a circular symmetrical configuration in which the members and end portions form circular segments relative to a longitudinal axis extending along the length of the U-shaped members. For example, see FIG. 4b clip 54 which has three U-shaped members or loops interconnected by two end portions at one clip end as compared to the three end portions of clip 6. This clip 54 however is asymmetrical. The end 54' of clip 54 has three bent end portions which should face toward the smaller diameter of the tapered bore portion 20' (FIG. 1a).

The clip 6 members 26, 28 and 30 and connecting portions, when hexagonal or other polygon shape in end view, are preferably symmetrical and parallel to axis 14', FIGS. 3 and 4. This parallelism is also preferred whether the clip is hexagonal or circular in end view.

Figure 23A:
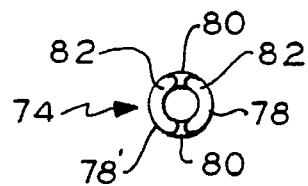
Figure 24A:
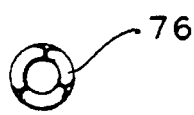
Figure 23B:
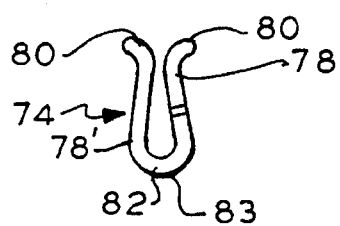
Figure 24B:
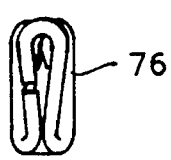

As shown in the embodiments of FIGS. 23b and 24b a two loop (U-shaped member) clip may be formed of members whose legs are bent inwardly toward one another. In FIGS. 23a and 23b, the clip 74 is symmetrical. That is, it does not matter which end of the clip faces the smaller tapered portion end of the housing bore 12. The members 78, 78' are interconnected by circular end portions 80. The members 78, 78' legs are interconnected by circular base portions 82. The legs of the clip 74 at end portions 80 taper toward one another. The view of FIG. 23a is the same as the bottom end view of the other end 83 of the clip 74 except the clip would appear rotated 90° in the bottom view. Because of the symmetry of the ends of the clip it does not matter which end is facing the bore 12 smaller diameter end of the portion 20'.

Clip 74 is similar to non-symmetrical clip 84, FIGS. 13, 14, 15 and 19, in which one U-shaped member 90 is used. In clip 84, the legs 86, 86' form a second elongated member 92 opposite member 90. Legs 86, 86' and legs 88, 88' of member 90 are respectively parallel. Also, the legs 86' and 88' terminate at the cut ends 94 of the wire forming the clip 84.

Segments 90' and 92' respectively interconnect legs 88, 88' and 86, 86'. The segments 90' and 92' arc radially outwardly from axis 96 relative to member 90 and legs 86, 86'. This forms an annular segmented circular ring arrangement for gripping the engaged cable or rod and for optimum engaging the housing tapered bore surface. The ring segments 90' and 92' face toward the housing tapered bore smaller diameter.

It should be understood for purposes of definition that the legs 86 and 86' and segment 92' also form a U-shaped member and legs 88 and 88' form a second U-shaped member with segment 90'. Both of these U-shaped members are three dimensional and non-planar. This configuration forms a three dimensional serpentine shape.

The cut ends 94 face the bore larger diameter end. This is to insure maximum wedge action by segments 90' and 92'. Because of the asymmetry, only the segments 90' and 92' should be oriented toward the tapered bore smaller diameter. The opposing pairs of legs preclude tilting of the clip during use.

In FIG. 15 the legs of clip 84 may flair outwardly somewhat as shown in dashed lines in an alternative embodiment.

In FIG. 6, clip 6 is fabricated from an elongated wire 56 of uniform cross section. The wire is severed at cuts 58 from the rest of the wire shown in phantom. The wire is serpentine with a string of interconnected S portions. The severed portion forming a clip has three interconnected S portions which are then bent to form the configuration of clip 6, FIGS. 3, 4 and 4a or with an end view of FIG. 4b. The location of the cuts would differ to produce the embodiment of clip 54, FIGS. 4b and 4c.

The wire 56 forming a clip may have any diameter according to a given implementation. In the embodiment shown, the wire 56 has a diameter of 0.070 inches (1.8 mm) for a ¼ inch cable and 0.040 inches (1 mm) for an ⅛ inch cable. The hardness for such wires is also important.

The wire should have a hardness preferably of at least Brite Basic wire. A wire that is acceptable is commercially available coat hanger wire (Brite Basic) of 0.080 inch (2 mm) diameter. Other wires may include C1010 low carbon uncoated Brite Basic, C1065 high carbon (PHOS M/W—music wire) (the hardest of these), C1065 high carbon (GALV H/D) and C1065 high carbon low tensile (HD MB CLI), all 0.080 inch diameter. These are given by way of example as there are numerous other different wire types that are acceptable.

The important criteria is the material and dimensions of the clip are such so as to create a gripping load, preferably resilient, against the gripped surfaces. Soft wire which permanently yields and deforms in response to a bend load such as solder wire may not be as desirable in certain implementations. However, in other implementations, soft wire such as solder wire is operative and acceptable. It is only necessary that the dimensions of the wire, clip and mating surfaces and hardness of the different materials be such so the clip grips the desired surfaces to provide the desired wedge action. In the embodiment of FIG. 1, this means the clip remains stationary with that gripped surface when displaced with the gripped surface relative to the tapered region to complete the wedge action.

Also, for thermoplastic applications, thermoplastic strands for use with thermoplastic housings and locking rods or cables may be employed using the material of the type specified above herein.

The clip 6, FIG. 3, is formed with an internal diametrical dimension t between opposite members and portions, e.g., member 26 and portion 50, that is smaller than the expected cable smallest outer diameter in the tolerance range for that cable size. For example, a ¼ (0.250 inch or 6.4 mm) inch cable may have a nominal tolerance of ±0.020 inches (0.5 mm) or a minimum diameter of 0.230 inches (5.9 mm).

The clip 6 has a minimum interference fit of about 10% with that smallest expected diameter cable. This is to insure optimum gripping of the cable (or rod). Harder cables and rod materials may require a smaller interference fit with a harder more resilient wire due to the wire stiffness. The maximum interference is a function of clip hardness, number of loop members hardness of the cable (or rod gripped) and resiliency of the clip material among other factors.

Because the U-shaped loop members are parallel, the members resiliently generally uniformly radially compress the cable along the length of the U-shaped members along axis 14'. By making the housing bore taper ∝ 3°, the clip 6 when wedged substantially grips the cable along the clip length. By making the angle ' 5° or greater this gripping action is lessened and thus results in the slippage of the cable.

It is preferable that the non wedged gripping action occur throughout the length of the U-shaped members 26, 28 and 30. Therefore the U-shaped members are preferably parallel to each other. Because of the resiliency of the wire, the end portions flex and permit this gripping to occur. The wire is relatively stiff such that the resilient deformation thereof creates relatively high gripping forces on the cable along the clip length.

In FIG. 2, clip is tangent to the cable 8. However, in practice, the cable, because the clip is of a smaller diametrical dimension t (FIG. 3), is crushed somewhat such that a greater area of the clip grips the cable. To increase the gripping area of the clip to the cable, the clip as mentioned above is circular in end view and thus engages more of the periphery of the cable. Thus all of the portions and legs of the clip are in compressive engagement with the cable with a circular clip configuration. This enhances the gripping action.

To provide even further gripping action, a clip 60, FIGS. 11 and 12 has U-shaped members 62, 64 and 66 which are each circular segments in end view of about the same diameter as the bundles 68 of cable 70. Further, the U-shaped members are arranged in a circular array in end view. Also, the U-shaped members extend along axis 72 approximately parallel to the helix angle of the bundles 68. This provides increased gripping action for certain implementations.

Because the clip is of annular configuration it contracts and expands radially to provide gripping action along the entire clip length on axis 14'. The clip in all embodiments to be described is always used to resiliently radially compressively grip the surface that is generally cylindrical. Such a surface includes for example cable 8, the rod of the embodiment of FIG. 5 or the inner walls of a cylindrical opening or recess whether or not round or polygon in end view. Such walls extend linearly parallel to the longitudinal axis as shown for example in the housing member channel in the embodiment of FIG. 27. This compressive gripping action, whether directed radially inwardly or outwardly in the appropriate arrangement, permits the clip to be axially moved in the opposing tapered bore or recess to a wedge clamping position by the axial displacement of the gripped member in certain of the disclosed embodiments.

The tapered bore 12 of the housing 4, FIG. 1, permits the clip and gripped cable to axially displace in the bore 12 in this embodiment. Such displacement is not necessary in all embodiments as will be described below. The housing is assembled with the clip in the bore therein. The cable is then assembled to the housing-clip assembly in direction 24. In this direction, the clip 6 displaces with the cable 8 because of the gripping action in direction 24 and of the increased bore 12 diameter at the closure 22' end of the housing. Because the clip 6 is resiliently compressively engaged with the cable, the clip 6 members 26, 28 and 30 are free to radially displace outwardly in the larger housing bore along their lengths in response to an axial force on the cable 8 in direction 24.

When cable 8 is displaced in the opposite direction 24', the clip 6 moves with the cable toward the smaller diameter of the tapered bore 12. This smaller diameter is smaller than the outer diameter of the clip and cable combination. This is because the cylindrical end portion bore is slightly greater than the nominal outer diameter of the cable alone. As the cable displaces the clip toward the smaller diameter bore portion 20' the clip 6 is crushed and wedged against the housing 4.

The harder the clip wire for a given cable hardness the greater the tendency of the clip to sever the cable at the clip end closest to the portion 16. The softer the wire, the less this tendency occurs. For the softest wire that is still resilient, an axial load on the cable will cause the cable to break at an external region distal the device 2. This provides maximum strength for a given use and cable strength. A harder clip wire tends to cut the cable where compressed against the cable.

By providing a clip with a given hardness relative to the hardness of a cable, a predetermined maximum tensile load can be set on the device at which the cable will break. For example, if a given cable has a breaking tensile strength of 6000 pounds, a relatively soft clip wire is provided such that the failure mode is the breaking of the cable external the device housing 4, FIG. 1. This device thus will withstand the entire load capability of the cable.

If it is desired to have the cable break at lower tensile loads this can be arranged. The clip is then made of wire of a predetermined hardness that will cut the metal cable where wedged so that the cable will break at this location at the desired load. Loads of 1000, 2000, 3000, 4000 or 5000 pounds, by way of example, or any other value are predetermined to break the cable using a clip formed of a wire of corresponding hardness and number loop members.

The radius R may also be used to set the preload at which the cable should break. By making R relatively small, the resulting taper has a steep incline toward the axis 14. The clip is thus abruptly wedged against the cable in a relatively short axial displacement. This abrupt action tends to increase the cutting action of the cable by the clip when using a hard wire clip.

The number of loop members also can be a factor in determining the breaking strength of the cable depending upon the number of loops in the annular array. For example, two loop members will not cut the cable to the same extent about the cable as three or more loop members.

If very soft wire, such as solder wire, is used it could extrude through the bore opening at portion 16 for certain dimensions of the opening and the lock will fail. The required dimensions to preclude failure can be determined empirically.

Also, if smaller diameter wire were used, e.g., 0.040 inches as compared to 0.080 inches for a ¼ inch cable, the wire clip may also extrude out of portion 16 under load. The smaller diameter wire is compensated for by providing more U-shaped loop members or fingers. For example a two loop clip that might extrude for a given diameter wire, e.g., 0.040 inches, but will not extrude with three loops. Thus a smaller diameter wire may be used with a greater number of loops for a given cable size. This also depends on the diametrical clearance between the housing opening 16 and the cable as compared to the clip wire diameter and number of loops.

For a given cable diameter, certain combinations of wire hardness and diameter may result in extrusion of a clip through the cylindrical portion 16 if the loop members are too few in number. This is due to the clearance between the cable and the housing at the openings 16 and 18, FIG. 1a, for example. This clearance is created by the relatively wide diameter tolerances for a cable of a given size as discussed above. This extrusion can be precluded by increasing the number of loops used, the wire diameter or the wire hardness. Also, the two loop (U-shaped members) configuration may be used on a smaller diameter cable than a three or greater number of loops.

The softer wire deforms more under a given load. Thus a softer wire requires a greater clip wire diameter for a given cable and load and also, possibly more loops. The softer wire also results in a greater load required to break the cable because it tends to deform more than a harder wire and thus tends to a lesser degree to cut the cable when compressed thereagainst.

A softer wire by deforming when crushed, serves as a shock absorber when a cable is axially pulled. As the clip wedges against a tapered surface it does not abruptly stop but tends to continue displacing axially to a resting wedge position with a more gradual deceleration rate as the softer material deforms which deceleration is gentler than with a hard wire.

A harder wire is more resilient than a softer wire and, therefore, will tend to permanently deform only when bent beyond a greater radial distance under load. Therefore, it will maintain its shape for use with a greater variety of cable diameters. It also wears less than softer wire and, therefore, exhibits greater durability for reuse.

The shape of the clip also affects the size of the diameter of the wire required to break a cable of a given size. A larger diameter clip wire is required to result in a cable breaking under axial load if the pitch space d, FIG. 6, between the U-shaped members is relatively large. A cable bundle may fit between the legs of the loop members. Thus the cable may not be held as tightly by the clip. This requires a larger diameter wire to hold the cable until it breaks under load. A smaller diameter wire is preferred because it is less costly and easier to fabricate.

The length of a clip is a factor to reduce the length of the housing 4 and thus the cost without substantially affecting the clip holding strength. The shorter the clip allows a shorter housing bore. When the clip grips the cable the clip spins with the cable as the cable is rotated. This minimizes wear of the clip and prolongs its life for reuse. Also, such spinning precludes tampering so that relative rotation of the stranded cable to the housing does not thread the cable free of the clip. This is important for seal applications.

A clip length of 0.375 inches for a ⅛ inch cable and a 0.750 length for a ¼ inch cable is preferred. Dimension t, FIG. 3 is 0.190 inches for a ¼ inch cable and 0.095 inches for a ⅛ inch cable. The gap between the ends 52, FIG. 4, may be 0.020 and 0.040 inches in this embodiment for ⅛ and ¼ inch diameter cables, respectively.

In FIG. 5, a second embodiment includes a locking device 100 comprising a metal housing 102 which has similar dimensions as housing 4, FIG. 1. In this embodiment a rigid circular cylindrical rod 104, e.g., steel or thermoplastic, is inserted into the tapered bore 106 of housing 102 in direction 108. The opposing ends of the housing 102 has openings 109 and 109' for closely receiving the rod 104. The dimensions of the housing 102 may be the same as the dimensions of housing 4, FIG. 1, except the tolerance for the end openings 109, 109' may be tighter to allow for tighter dimensional control of the rod 104 as an anti-picking measure, e.g., 0.001 inch (0.025 mm) greater diameter.

A clip 110, which is identical to clip 6, FIG. 1 is located in the bore 106 and locked therein by the restricted openings at the housing ends of smaller diameter than the clip outer radial dimensions. It is preferred the clip 110 be circular in end view.

The rod 104 has a metal flag 112 swaged to the rod at one rod end. The rod 104 has annular parallel grooves 114 at an end opposite the flag 112. The grooves may be as described in the aforementioned application Ser. No. 106,428 mentioned in the introductory portion and incorporated by reference herein. The grooves 114 need not be of the shape as described, but may have any configuration, e.g., threads. Also, the grooves may be discontinuous in the annular direction. Any other rod surface roughness is acceptable to enhance the gripping action.

Figure 4C:
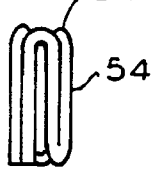
Figure 4E:
Figure 4G:
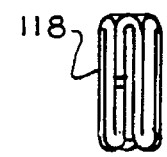

FIGS. 4b, 4d and 4f illustrate end views of different clip configurations employing a three loop (circular end view) clip 54, four loop (polygon in end view) clip 116 and five loop (polygon) clip 118. FIGS. 4c, 4e and 4g show respective side elevation views respectively of clips 54, 116 and 118. The clips 116 and 118 are symmetrical and can be inserted in the housing 102 bore, FIGS. 5 and 1, respectively in either axial orientation.

In the embodiment of FIGS. 7–9, locking device 120 comprises a somewhat rectangular housing 122 with rounded edges and which may be formed of the same material as the housings 4 and 102 discussed above. Two identical parallel spaced tapered bores 124 and 126 are in housing 122. A clip 127 is in each bore, the clips 127 may be identical to clip 6, FIG. 1, i.e., a three loop configuration preferably circular in end view.

Bores 124 and 126 are identical in this embodiment to the bore 12 of housing 4, FIG. 1. Each bore has a surface 128 and 130 respectively formed by a generating curve of radius R rotated about an axis as described above for the bore portion 20', housing 4, FIG. 1a. Respective surfaces 132 and 134 of bores 124 and 126 are conical preferably having a 3° angle with the bore 124 and 126 longitudinal axes. The compound bore surfaces formed by the conical and radial surfaces are interconnected by a radius to form a continuous smooth bore surface.

End 136 of the housing is formed with a recess 138 between the bores 124 and 126. Also the housing 122 is formed initially with an annular end recess 140. A plug 142 with an annular rib 144 fits snugly into the recess 140. The end 136 of the housing 122 is rolled over to swage the plug 142 rib 144 to recess 140.

The plug 142 has a projection 145 with a through aperture 146 of restricted smaller diameter with respect to diameter surface 132 of the larger end of bore 124. Aperture 146 is of about the same diameter as surface 148 and aligned on axis 152. Plug 142 also has a second projection 147 having a blind hole 156 on axis 154. The plug 142 projection 147 seals the bore 126 at housing end 136. Projection 145 has an axial length 1 which is shorter than axial length 1' of projection 147.

The bore 124 has a circular cylindrical surface 148 of the same diameter as and at the bore smaller diameter surface 128 end and a circular cylindrical surface 150 of the same size as and at the bore surface larger diameter end. The bore 126 has identical circular cylindrical end surfaces as bore 124. The cylindrical end surfaces 148 and 150 have the same axial extent along respective axes 152 and 154. Because the clips 127 are symmetrical it does not matter which end faces the bore 124 and bore 126 ends.

In FIG. 7, cable 156, which may be ⅛ or ¼ inch diameter by way of example, has one end inserted into bore 126 and engaged with the corresponding clip 127. The clip 127 resiliently engages and grips the cable in interference fit as discussed above. Thus axial displacement of the cable in direction 160 to pull the cable out of the bore 126 pulls the clip 127 therewith. This causes the clip 127 to wedge against the surface 128' locking the cable to the clip and housing. To preclude tampering, the cable is then preloaded in direction 160 with an axial load of about 500 pounds (2.16 Kg). This wedges the clip to the cable and housing with sufficiently high force that a tampering to release the cable from the clip is difficult. The clip wedges because its combined diameter with that of the cable is sufficiently greater than that of the cylindrical surface 148' to preclude the two elements from passing through the end aperture 148".

In FIG. 10, a device 120' similar to device 120, FIG. 7, is shown using a steel or thermoplastic rod 162. Housing 122, plug 142 and clips 127 are otherwise the same as in the embodiment of FIG. 7. A primary difference is that the apertures 164 at the smaller end of the bores 124' and 126' are of tighter tolerance than the apertures 148" of the device 120, FIG. 7. This tighter tolerance is possible because the rod 162 can be fabricated to tighter tolerances than a stranded cable. The tighter tolerances are necessary to provide anti-picking close fit of the rod to the housing at the housing entrance to the tapered bores 124' and 126'.

FIGS. 16 and 17 show a two loop asymmetrical clip 164 used with a cable 166. The clip 164 is similar to the clip 84, FIGS. 13–15 except clip 164 is circular in end view. A two loop clip may be used with larger diameter wire than a 3 loop clip for a given set of dimensions of the housing bore and cable size. Also the 2 loop configuration is better for a smaller diameter cable such as a ⅛ cable. The use of at least two loops is desired to preclude misorientation by tilting of the clip if only one loop were used as shown in FIG. 18.

In FIG. 18, clip 170 comprises a single U-shaped loop 172 having an arcuate connecting portion 174 at one loop end and two circular segment portions 176 and 178 at the other clip end. These portions form a serpentine configuration. Portions 176 and 178 form a segmented ring in a plane. As mentioned, the loop 172 is asymmetrical and may result in the clip tilting during use. The portions 176 and 178 are placed facing the smallest diameter end of the tapered bore of the mating housing. A larger diameter wire would be employed with larger diameter cables. The single loop is useful with small diameter rods and cables. However, this clip might tilt in use and is not as desirable as a dual loop clip 84 of FIGS. 13–15 and 19.

Figure 20:
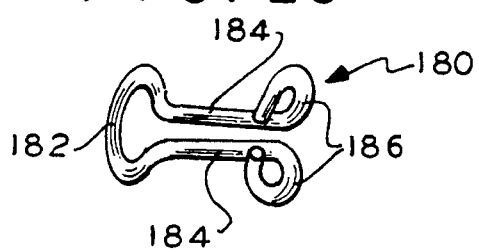

In FIG. 20, clip 180 has a circular end portion 182 terminating in parallel legs 184. Legs 184 in turn terminate in arcuate circular segments 186 in mirror image fashion. The ring-like arrangements of portion 182 and 186 at opposite leg ends preclude tilting of the clip during use and provide symmetry with respect to not requiring a specific orientation when installed in the housing tapered bore. The ring-like arrangements resiliently grip the cable or rod. When urged toward the tapered bore smaller end, the ring-like segments at that clip end wedge against the housing and cable or rod.

Figure 21:
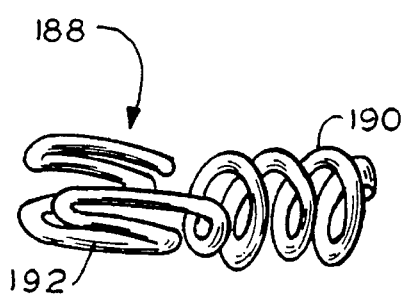
Figure 21A:
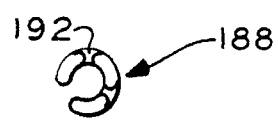
FIGS. 21a, 22a, 23a and 24a are respective end views of clips according of further embodiments
Figure 21B:
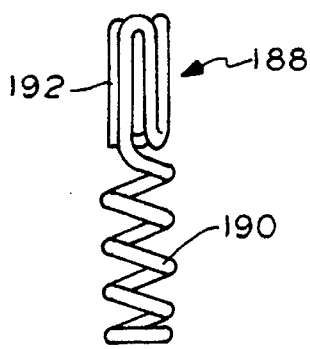

FIGS. 21, 21a and 21b show a three loop clip 188 with a clip body 192 similar to the clip 54, FIGS. 4b and 4c. The difference is that clip 188 also includes a multiple coil spring 190 formed from the same piece of wire as the clip body 192. In use, the spring urges the clip body 190 toward the tapered housing bore smaller diameter end of a housing having a tapered bore as discussed above. In certain implementations where such additional urging is desired the integral one piece spring avoids the necessity of adding a further spring. The housing bore is provided with additional length to accommodate the spring. The clip body still resiliently grips the cable or rod in interference fit, the spring providing additional assurance of locking action.

Figure 22A:
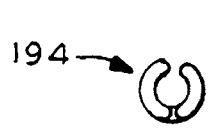
Figure 22B:
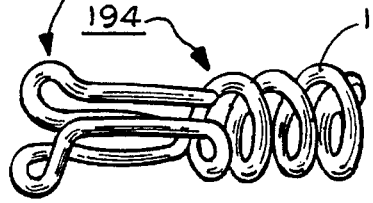

The clip 194 of FIGS. 22a and 22b includes a clip body 196 and spring 198 integrally formed with the body 196. the clip 196 is of similar construction as the clip 84, FIG. 19 except that the spring 198 extends from one of the clip legs.

Figure 25A:
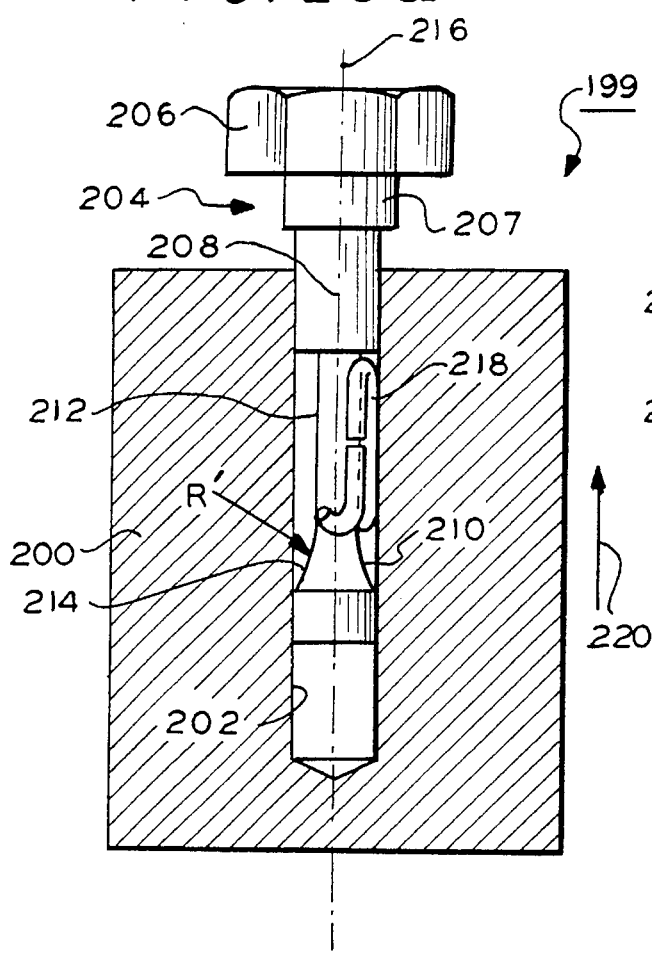
FIG. 25a is a side elevation sectional view of a locking device according to a further embodiment of the present invention.
Figure 25B:
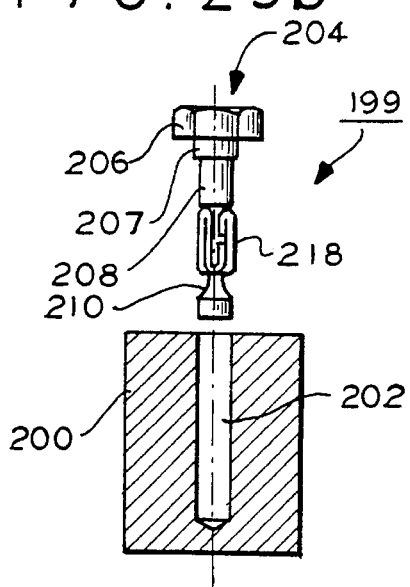

In FIGS. 25a and 25b, device 199 includes a housing or block 200 having a circular cylindrical blind bore 202. A bolt 204 has a hexagonal head 206 and a shoulder 207 from which depends a shaft 208. Shaft 208 is formed with an annular tapered recess 210. The recess 210 has a conical portion 212 which merges smoothly with the conical portion 214 in a continuous smooth surface. The curved portion 214 is generated by rotating a curve of radius R' about axis 216.

A clip 218, which may be identical with the three loop clip 6, FIG. 1 or clip 127 FIG. 7, for example, is secured to bolt 204 in recess 210. The clip does not resiliently engage or grip the bolt shaft 208 in the position shown in FIG. 25a. The clip 218 is free to axially displace along the shaft 208. This is similar to the operation of the devices of FIGS. 1, 5, 7 and 10. In all of these embodiments the clip is free to axially displace in the tapered bore regions. The clip in these embodiments in contrast grips the cable or rod so as to be displaced upon displacement of the cable or rod in the tapered bore.

The outer diametrical dimension of the clip 218 however is such that the clip 218 radially resiliently compressively outwardly grips the inside surface of the bore 202. The bore inside surface may be smooth, rough or grooved. The rougher the surface the better the gripping action for a given implementation. For example, the block 200 may be metal, concrete or other materials. In this embodiment the bore 200 is circular cylindrical.

Figure 27:
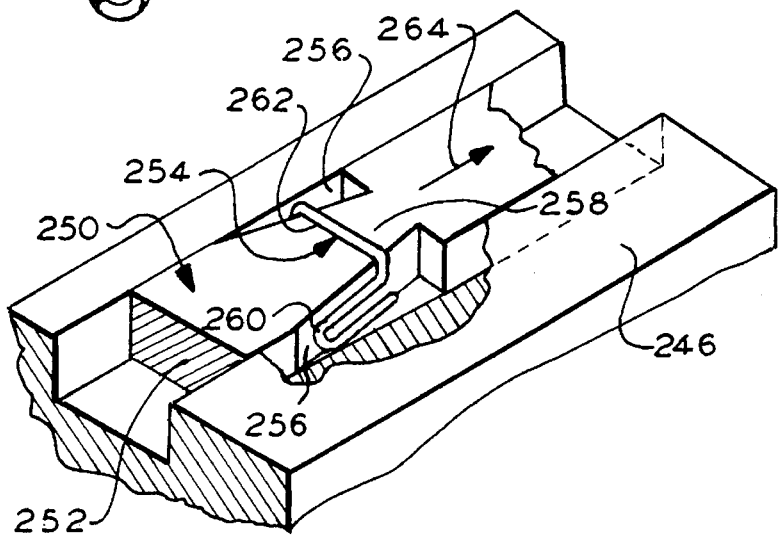
FIG. 27 is an isometric view of a further embodiment employing a rectangular channel in a housing member and a rectangular bar with tapered sides using a clip of the present invention for axially locking the bar to the housing.

If the Cylindrical surface, e.g., the housing or rod, is smooth, FIGS. 10, 25a or 27, then it is preferable that the component with the tapered surface be formed from the hardest material and the cylindrical surface component be the softest. The clip is preferably of a hardness therebetween. If the surface of the cylinder is rough, then these relative hardnesses need not be maintained.

In operation, in FIG. 25b, the bolt 204 with the assembled clip 218 is positioned for insertion into the bore 202. the bolt is then inserted with the clip 218 into the bore 202. The bore 202 has sufficient length such that once the clip is inserted in the bore, it can not be removed.

A reversal of the bolt displacement in direction 220 causes the tapered recess 210 larger diameter at radius R' to engage the clip 218, which in the interim is held in place by its grip with the bore 202. The surface of radius R' forces the clip radially outwardly against the bore 202 internal surface. This action wedges the clip 218 between the shaft 208 and the block 200 bore 202. Once the wedging action occurs the clip is no longer free to axially slide in the bore 202 and locks in place. This prevents withdrawal of the bolt 204 in direction 220. While a three loop symmetrical clip 218 is shown other clips of different configurations may be used.

Figure 26A:
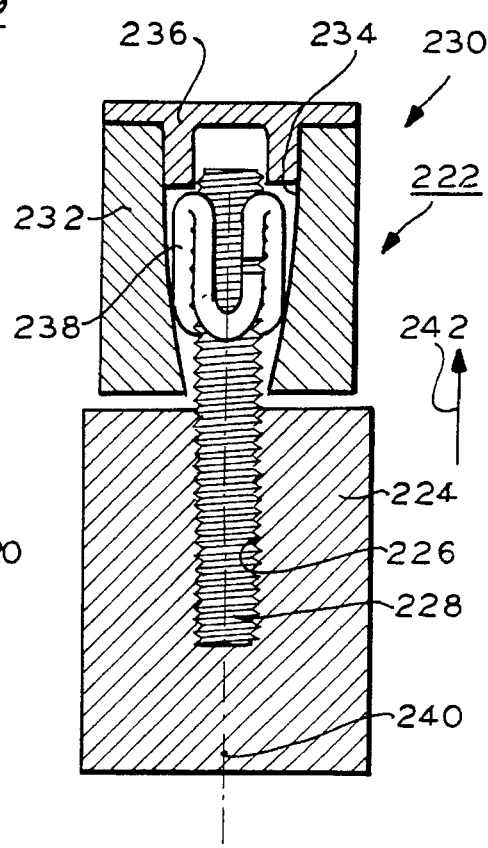
FIG. 26a is a side elevation sectional view of a locking device according to a further embodiment of the present invention.
Figure 26B:
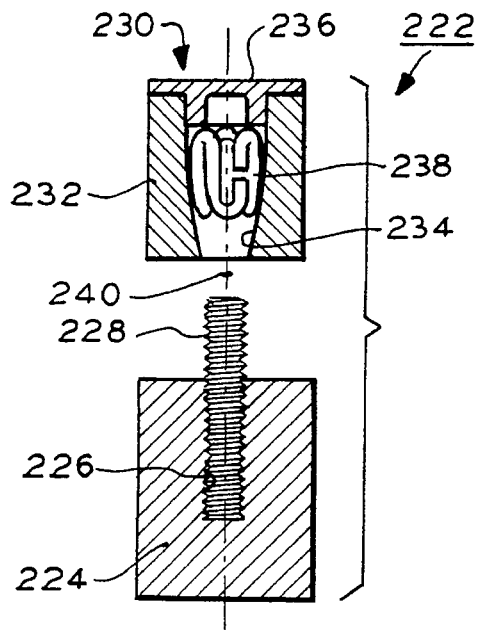

In FIGS. 26a and 26b, locking device 222 includes a block 224, which may be metal, having a threaded bore 226. A threaded stud 228 is in threaded bore 226. A lock assembly 230 comprises a housing 232, which may be metal, having a tapered bore 234, a cap 236 and a clip 238. The bore 234 is tapered in a manner described for the housings of FIGS. 1, 5 and 7. That is, the bore has a smooth compound curved surface comprising a conical portion and a portion formed by a surface of revolution formed by a curve of a given radius rotated about an axis.

The clip is free to axial displace in the bore 234 along axis 240. The clip, for illustration, is a three loop configuration as shown in FIG. 3 or circular in end view. The clip 238 has an internal diametrical dimension that is smaller than the outer diameter of the stud 228. The interference fit is at least 0.010 inches (0.25 mm) and may be greater according to a given implementation. The interference is such that the clip 238 grips the stud 228 so as to be displaced by relative axial displacement of the stud along axis 240 by the displacement of the housing 232 over the stud.

In operation, the lock assembly 230 is positioned as in FIG. 26b with the bore 234 aligned with the stud 228. stud is then inserted into the bore 234 and into the bore of the clip 238. The radial compression of the clip 238 with the stud causes the clip to axial displace relative to the housing 232 when the housing is displaced in withdrawal direction 242.

This wedges the clip 238 against the tapered bore surface of bore 234 of assembly housing 232.

In the alternative, the housing 232 may be made of thermoplastic material. A nut (not shown) may be threaded to the stud between the block 224 and housing 232. The assembly 230 is used to seal the nut to preclude its disengagement. When it is desired to remove the nut, the housing 232 is fractured or destroyed.

In FIG. 27, a rectangular channel 244 is formed in a member 246. The channel 244 may have an open side 248. A locking assembly 250 comprises a rectangular in transverse shape bar 252 and a clip 254. The bar 252 has opposite tapered sides 256. The tapered sides form a trapezoidal section 258 in the bar.

Clip 254 comprises a pair of diametrically opposite U-shaped loops 260 (one being shown). Each loop 260 is between a different tapered side 256 and the side of the channel 244 of member 246. A connecting portion 262 connects the two loops and is oriented closest to the narrowest end of the tapered sides 256. This is to maximize the amount of material that will wedge between sides 256, 244 and 248. The clip 254 is free to axially displace in the tapered region of sides 256. The loops 260 compressively transversely engage the sides of the channel 244 so as to resist relative axial displacement of the clip when the bar 252 is displaced.

When the bar 252 is displaced in direction 264, the clip 254 is wedged between the bar 252 and member 246 in the channel 244, locking the bar axially to the member 246. Other structure, not shown, if desired, can be used to retain the bar 252 in the channel 244 transverse direction 264 at open side 248.

In FIG. 28, locking device 270 comprises in a further embodiment a housing 272, a three loop symmetrical clip 274 and a metal stranded cable 276 having a flag 278 swaged at one end of the cable. The housing 272 has a tapered through bore 280. Bore 280 comprises two mirror image tapered sections 282 which are contiguous in the bore axial central region. Each section 282 preferably comprises a dual taper tapering bore similar to the bore 12, FIG. 1a, of housing 4. One taper is conical and the other is formed by a radius which forms a surface of revolution. However, as in the prior embodiments described above, such a dual taper in each section is not essential and can be replaced by a single conical taper for each section. The bore 280 has a circular cylindrical opening 284 of restricted diameter at each end for closely receiving the cable 276.

The housing 272 has a radial bore 286 in communication with the bore 280 and the ambient atmosphere. A pin 288 is in bore 286 and extends transversely into the through bore 280 in axial alignment with at least a portion of clip 274. A second radial bore 290 (phantom) and a second pin 292 (phantom) may be employed spaced along the b ore 280 in alignment with the other end of the clip 274. certain implementations.

In operation, the pin 288 prevents the clip 274 from axially displacing in direction 294 in response to the insertion of cable 276 into the axial bore of clip 274. When the cable is inserted into the clip bore, the clip having a smaller diameter than the cable for resiliently gripping the engaged cable would be pushed by the cable into the wedge position to the right of the FIG. locking the cable when inserted into the clip bore and precluding further insertion of the cable through the device housing bore.

After the cable is inserted through the housing bore a desired distance, the pin 288 is removed and replaced by a press fit plug 296, FIG. 29. The plug prevents tampering with the device 270 to remove the cable. Without the pin 288 the clip 274 is axially free to displace in either opposite axial directions along axis 298. When the clip so displaces it wedges the cable to the housing at opposite ends of the housing bore 280 in accordance with which direction the cable 76 is pulled.

By using a second pin 292, the cable 276 can be inserted in either axial direction into the housing bore 280. Both pins are then replaced by corresponding press fit plugs. Screw may replace the plugs in non-seal applications In FIG. 30, a further locking device embodiment comprises a device 300 including a housing 302 and a symmetrical clip 303 for locking a cable 304 thereto. The housing 302 comprises two halves 306 and 308 which are threaded together by threads 310. The two halves form a single tapered housing bore 311 having contiguous continuous mirror image dual tapered sections 312 and 314.

The bore 311 tapered sections are dimensioned so that the clip 303 has sufficient room in the bore 311 to permit the cable to be resiliently gripped by the clip. However, the sections are dimensioned so that any displacement of the cable axially wedges the clip 303 in the corresponding tapered section 312 or 314. Thus, the cable is locked axially in tow opposite directions once the housing halves are assembled together. The device 300 can thus be places arbitrarily along any position of the cable 304 and locked in place. this is desirable for example to secure the cable in a given position to a mounting structure (not shown) with negligible axial play.

It should be apparent that the bolt 204, FIGS. 25a and 25b, may, in the alternative, have dual tapers in mirror image fashion to the dual tapers formed by the tapered sections 282 of housing bore 280 FIGS. 28 and 29.

A three loop clip is preferred for use with a circular cylindrical rod, cable or bore, but other loop configurations may be used.

Regardless the number of loops or particular configuration of the clip, the legs and connecting portions form a generally serpentine configuration. This configuration is axially free to displace in the tapered region of the mating locking device and resiliently radially grips the axially extending cylindrical member or bore, as applicable, whether or not circular, in interference fit therewith.

It should be understood that the terms loop, fingers, lobes or "U-shaped" members as used in the claims are intended to be generic terminology to describe the general shape of the clip. U-shaped members form loops or lobes. It is not intended that U-shaped members be construed in the claims to comprise literally only two parallel linear legs connected by a base portion. For example, the legs and base portions may be arcuate rather than linear as illustrated.

It should be recognized that lobes or fingers are also appropriate descriptions of U-shaped members. Lobes, however, which might imply that the members comprise arcuate legs rather than linear legs, are not intended to be so limited as used in the claims. The term loop as used in the claims are intended to include all of the above mentioned clip shapes.

Also, it is not intended that the term loop, lobe or U-shaped member refer to a planar structure, but may include a three dimensional looping structure as shown in the different embodiments. For example, the term loop may included the embodiments of FIGS. 4, 18, 19 and 20. In FIGS. 4, 18 and 19 each U-shaped member forms a loop. In FIG. 20 the legs 184 and circular end portion 182 forms a loop.

The clip exhibits radial compressive force on the cylindrical rod, cable or housing bore as the case may be, along the entire length of the clip. For example, in FIG. 4, both clip axial ends and the intermediate portion radially compress the cable 8 substantially uniformly along the clip 6 length. This radial compression along the clip length maximizes the gripping action of the clip.

Also, in all embodiments the gripping action and interference fit of the clip is always with the cylindrical surface. In contrast, the clip is loosely secured to the tapered surface in the appropriate embodiments so that the clip may axially displace relative to the tapered surface while the clip is gripped on the opposing cylindrical surface. This action therefore eliminates the need for an added spring. This spring is used to urge the gripping element toward the narrow end of a tapered bore of the casing to create the wedge action.

Additionally, it is preferred the end of the clip with the most material faces next adjacent to the smaller end of the tapered surface. For example, in FIG. 18, segment portions 176 and 178 are oriented closest to the tapered bore portion 20' at bore 16, FIG. 1a. In the embodiment of FIG. 14, the ends 94 face the larger end of the tapered bore or surface. In FIG. 19, the segments 90' and 92' face the narrower end of the tapered surface. A similar orientation is illustrated by the dual loop clip 164 of FIGS. 16 and 17 and clip 254, FIG. 27. For symmetrical clips such orientation considerations are not a factor.

It is preferred that the relative hardness of the materials is such that the cylindrical surface be formed of the softest material and the tapered surface be formed of the hardest material. The clip hardness is preferred to be intermediate the two extreme hardness of the mating surfaces.

What is important is that wire-like material be used to form the clips as compared to flat sheet material of relatively large breadth as compared to thickness as disclosed for example in U.S. Pat. No. 968,665 discussed in the introductory portion. Also, while wire-like material is preferred it is not essential that the wire-like material be of the preferred uniform cross sectional area. In certain implementations, such uniform cross section may not be a factor in the gripping action of the clip.

This is not to imply however that rectangular wires may not be used. The wires or strand material used to form the clip need not be circular in cross sectional area. Square or rectangular elongated members may also be used.

It will occur to those of ordinary skill that various modifications may be made to the disclosed embodiments. The scope of the invention is intended to be defined by the appended claims.

What is claimed is:

1. A locking device comprising:

a housing having an opening on a first axis;

a first member received in the opening along said axis; and a serpentine shaped clip received in radial resilient compressive engagement with one of said housing at said opening and first member, the other of said housing and first member having a tapered surface for receiving the clip, the clip, opening and tapered surface being dimensioned so that the received clip is wedged in locked engagement to and between the housing and first member at the tapered surface in the opening in response to relative axial displacement of the first member and housing, said clip comprising a single piece of homogeneous material including a plurality of loop members extending along a second axis generally along said first axis, said clip including a further member extending annularly about said second axis, at least one of said loop members extending from said further member.

2. The device of claim 1 wherein the first member is a stranded cable having a longitudinal axis and comprising twined multiple bundles of multiple strands each, each bundle lying in a plane inclined relative to said longitudinal axis along a helix about the axis, said plurality of loop members being inclined to said second axis at approximately the same helix inclination as said bundles.

3. The device of claim 1 wherein at least a portion of the plurality of loop members lie in at least one corresponding plane inclined relative to said second axis.

4. The device of claim 1 wherein said plurality of loop members being arranged in an array about said second axis, each loop member of the plurality having a U-shape including an end portion at a proximal end and a pair of legs extending from the end portion to a U-shaped member distal end, at least one leg at the distal end of each of two adjacent U-shaped members being joined by a distal further end portion forming said further member.

5. The device of claim 4 wherein the portion at the proximal end is formed into a second further member extending in an annular direction about the second axis, said second further member for receiving said first member received in the opening.

6. The device of claim 1 wherein at least a portion of the clip lies on a surface of revolution defining a clip maximum outer diameter, the housing opening forming a tapered bore, the housing bore having a larger diameter greater than the said maximum outer diameter, said housing bore having a smaller diameter smaller than said maximum outer diameter.

7. The device of claim 1 wherein the one of the housing and first member engaged with the clip in said resilient engagement has a hardness less than that of the clip and the clip has a hardness less than the other of the housing and first member having said tapered surface.

8. The device of claim 1 wherein the housing opening is tapered and is defined by a surface of revolution generated by contiguous curves, one of the curves being defined by a radius.

9. The device of claim 1 wherein said housing opening comprises a plurality of tapered bores in spaced relation, and further including a like plurality of clips, a clip being in each housing bore.

10. The device of claim 9 wherein the first member received in the opening is cylindrical, the housing bores have opposing ends, the bores each being open to the ambient atmosphere at at least an end adjacent to the smaller diameter, at least one of the bores for receiving said cylindrical member only at the corresponding bore smaller diameter end.

11. A locking device comprising:

a housing having an opening on a first axis;

a member for being received in the opening along said axis; and a serpentine shaped clip received in radial resilient compressive engagement with one of said housing at said opening and member, the other of said housing and member having a tapered surface for receiving the clip, the clip, opening and tapered surface being dimensioned so that the received clip is wedged between the housing and member at the tapered surface in the opening in response to relative axial displacement of the member and the housing;

the housing bore being tapered and being defined by a surface of revolution generated by contiguous curves, one of the curves being defined by a radius.

12. A locking device comprising:

a housing having an opening on a first axis;

a member received in the opening along said axis; and a serpentine shaped clip comprising a circular in cross section wire in radial resilient compressive engagement with one of said housing at said opening and member, the other of said housing and member having a tapered surface for receiving the clip, the clip, opening and tapered surface being dimensioned so that the received clip is wedged in locked engagement to and between the housing and member at the tapered surface in the opening in response to relative axial displacement of one of the member and housing.

13. A clip for locking a received member to a housing, one of said housing and member having at least one surface tapered relative to a first axis and the other a cylindrical surface, said housing including an open region for receiving said clip and member at said first axis and at said at least one tapered surface and cylindrical surface, said clip comprising:

an elongated member having first and second ends and defining, a first loop member having proximal and distal ends, said loop member extending along a second axis between said ends generally along the first axis; and a further member joined to the loop member at one loop member end and extending at least partially about the second axis to form a serpentine structure with the loop member, the serpentine structure being radially resilient relative to the second axis and dimensioned to extend at least partially about the received member in resilient radial compressive gripping engagement with at least one of said housing and received member, the tapered surface being dimensioned to receive the clip and permit the received clip to be displaced along the first axis.

14. The clip of claim 13 including at least one second loop member secured to one of the first loop member and further member spaced from the first loop member for receiving the received member therebetween and forming an extension of said serpentine structure, said first and second loop members being radially resilient between and at their distal and proximal ends.

15. The clip of claim 14 wherein the loop members are U-shaped.

16. The clip of claim 14 including a third loop member extending along said second axis and being radially resilient between and at the proximal and distal ends relative to said second axis and including a second further end member secured to one of said loop members, said third loop member and second further end member forming a further extension of the serpentine structure.

17. The clip of claim 14 wherein said loop members are substantially symmetrical.

18. The clip of claim 14 wherein said further member is arcuate relative to said second axis.

19. The clip of claim 15 wherein said loop members each have a pair of legs and an end member connecting the pair of legs, the end member and legs being coplanar.

20. The clip of claim 15 wherein the U-shaped members and distal ends form a circular ring in end view.

21. The clip of claim 14 including a coiled spring secured to one of said further end and loop members, the loop members, further end and spring being one piece.

22. The clip of claim 15 wherein the spacing between the U-shaped members is tapered toward each other in a direction toward one of said proximal and distal ends.

23. The clip of claim 14 wherein the loop members are parallel to the second axis.

24. The clip of claim 14 wherein the loop members are inclined toward one another.

25. The clip of claim 15 wherein legs of each U-shaped member taper toward one another.

26. A locking device comprising:

a first member having a longitudinal axis;

a housing having a chamber lying on a first axis and at least one opening in communication with the chamber for permitting said member to pass through the opening into said chamber along said first axis;

one of said first member and housing chamber having a region tapering from a larger dimension transverse the axis to a smaller dimension transverse the axis in a direction along the first axis and the other having a cylindrical surface; and a clip secured to the one of the first member and housing in said tapering region for relative axial displacement in the tapering region, said clip comprising an elongated resilient serpentine member including a loop member extending along the first axis and an end member secured to the loop member and extending at least partially about the first axis, said clip defining a bore having a second axis for receiving the first member, said clip being received in the housing chamber and dimensioned to compressively radially engage and grip the cylindrical surface of the other of the first member and housing, said clip being dimensioned relative to said tapered region and to said member and housing such that the clip is wedged in locked engagement to and between the first member and said housing in response to the relative axial displacement of the first member to the housing.

27. The device of claim 26 wherein the first member is a cylindrical rod and the housing chamber having said tapering region wherein the tapering region tapers from a smaller transverse dimension to a larger transverse dimension, said clip being in compressive resilient radial engagement with the rod.

28. The device of claim 27 wherein the rod has a plurality of annular grooves.

29. The device of claim 28 wherein the grooves are helical.

30. The device of claim 26 wherein the first member is a cylindrical rod, said tapering region comprising a tapered recess in the rod extending along the longitudinal axis, the tapered recess tapering from a smaller diameter to a larger diameter, said housing chamber comprising a cylindrical bore, said clip being in resilient radial compressive engagement with the housing bore transverse the first axis.

31. The device of claim 30 wherein the chamber comprises a cylindrical bore with a plurality of annular grooves.

32. The device of claim 31 wherein the grooves are helical.

33. The device of claim 26 wherein the chamber comprises a channel rectangular in transverse section, the first member being rectangular in transverse section, said first member having a tapered region, said clip being secured to the first member in said tapered region.

34. The device of claim 26 wherein said loop member is cantilevered from the end member along the second axis.

35. A locking device for securing a cylindrical member thereto comprising:

a housing having a bore which tapers from a larger diameter to a smaller diameter along a first axis, said housing having at least one opening for receiving said cylindrical member in said bore along said first axis; and a clip in said tapered bore, said clip comprising an elongated resilient member having a serpentine configuration having a loop extending substantially along the first axis and a portion secured to the loop and which extends substantially about the first axis, said clip defining a bore having a second axis for receiving the cylindrical member, the clip being dimensioned to axially slidably receive the cylindrical member in compressive engagement therewith, said clip being dimensioned relative to said tapered bore and to said cylindrical member such that the clip is wedged in locked engagement to and between the cylindrical member and said housing in response to the relative axial displacement of the cylindrical member toward the smaller diameter.

36. A locking device comprising:

a housing having an opening on a first axis;

a member for being received in the opening along said first axis; and a clip having a serpentine shape and formed of material of a given thickness in radial resilient compressive engagement with one of said housing at said opening and member and including a loop extending substantially along the first axis a given length substantially greater than the given thickness in a non-engaged state, the clip including a portion secured to the loop and extending substantially at least partially about the first axis, the clip being in said resilient radial compressive engagement along substantially the axial length, the other of said housing and member having a tapered surface for receiving the clip, the clip, opening, and tapered surface being dimensioned so that the received clip is wedged in locked engagement to and between the housing and member in response to relative axial displacement of the member to the housing.

37. A locking device comprising:

a housing having an opening on a first axis;

a member received in the opening along said axis; and a clip in radial resilient compressive engagement with one of said housing at said opening and member, said clip having a serpertine shape and including a first portion extending primarily along the first axis and a second different portion extending primarily about the first axis, the other of said housing and member having contiguous dual mirror image tapered surfaces extending along the axis for axially receiving the clip, the clip, opening and tapered surfaces being dimensioned so that the received clip is wedged in locked engagement to and between the housing and member in response to relative axial displacement of the member to the tapered surfaces in either of two opposing directions in the opening.

38. The device of claim 37 wherein the clip has an axial extent along the axis, the clip being in resilient radial engagement substantially along the axial extent.

39. The device of claim 37 wherein the clip is serpentine in shape.

40. The device of claim 37 wherein the clip is dimensioned to axially displace in response to said relative axial displacement, further including clip holding means for precluding wedging axial displacement of the clip in at least one of said two axial directions.

41. The device of claim 40 wherein the clip holding means comprises a pin releasably secured to said housing for selectively engaging the clip.

42. The device of claim 37 wherein the housing comprises two mating releasably attached portions, the dual mirror image tapered surfaces being dimensioned to substantially preclude axial displacement of the clip in two opposing axial directions.

43. A locking device comprising:

a housing having an opening;

a member in the opening, said member for supporting a given maximum axial tensile load value; and a clip in the opening between the member and housing, said clip, housing and member being dimensioned so that the member is wedged to the housing in the opening by the clip in response to relative axial displacement of the housing to the member and the clip and member being further arranged so that the member fails under said tensile load, and the member fails at a selected tensile load value when wedged as a function of at least one of the material and shape of the clip.

44. The device of claim 43 wherein the member is a stranded cable and the clip is a wire of a given hardness corresponding to said selected load value.

45. The device of claim 43 wherein the clip is serpentine in shape.

46. A locking device comprising:

a housing having an opening on a first axis;

a member for being received in the opening along said axis; and a serpentine shaped clip received in radial resilient compressive engagement with one of said housing at said opening and member, the other of said housing and member having a tapered surface for receiving the clip, the clip, opening and tapered surface being dimensioned so that the received clip is wedged between the housing and member at the tapered surface in the opening in response to relative axial displacement of the member and the housing;

the one of the housing and member engaged with the clip in said resilient engagement has a hardness less than that of the clip and the clip has a hardness less than the other of the housing and member having said tapered surface.

\* \* \* \* \*